Figure 1:
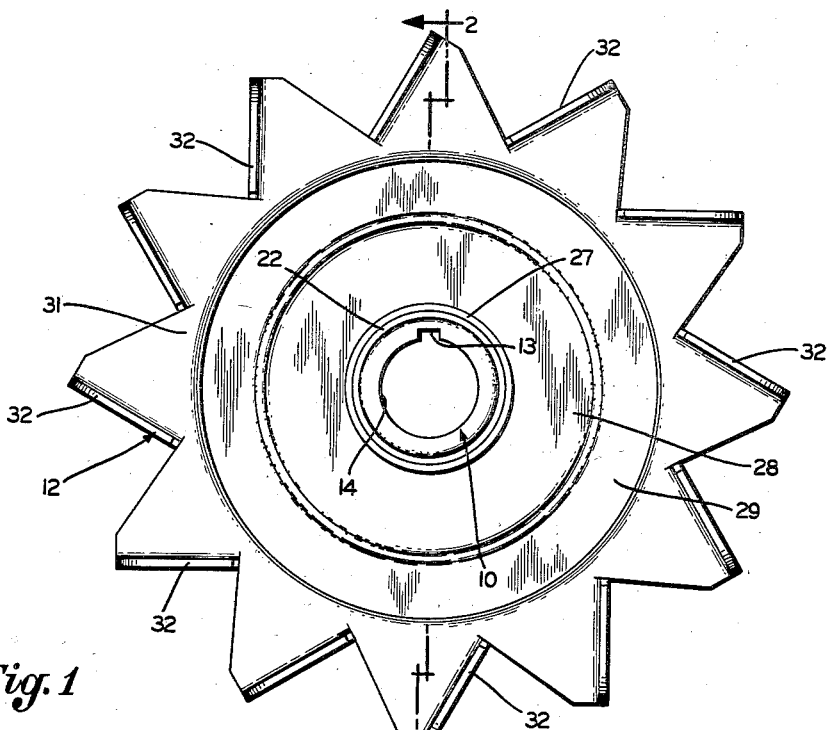

March 18, 1958 R. J. KILLIAN 2,827,225
GENERATOR PULLEY CONSTRUCTION
Filed May 4, 1956

INVENTOR.
Robert J. Killian
BY
Frease & Bishop
ATTORNEYS

United States Patent Office 2,827,225
Patented Mar. 18, 1958

2,827,225

GENERATOR PULLEY CONSTRUCTION

Robert J. Killian, Canton, Ohio, assignor to Automatic Steel Products, Inc., Canton, Ohio, a corporation of Delaware Application May 4, 1956, Serial No. 582,755

3 Claims. (Cl. 230—135)

My invention relates to improvements in generator pulley construction and more specifically to a multi-groove preferably roller formed pulley construction for use in rotating and cooling generators on automotive vehicles.

All automotive vehicles are provided with some form of V-belt drive, which drive usually derives its power from the crankshaft of the vehicle engine. Further, these V-belt drives are usually comprised of one or more pulleys, having one or more V-grooves formed therein, being mounted on the crank-shaft, with V-belts connecting these grooves with the grooves of pulleys mounted on various auxiliary equipment of the vehicle or vehicle engine such as generators, water pumps, air conditioning, compressors and the like.

The V-groove pulley which is mounted on the generator of the vehicle must serve a dual purpose, not only the purpose of rotating the generator in order to produce electrical energy, but also the purpose of cooling this generator by circulating air therethrough while the electrical energy is being produced. Thus, it is necessary to provide a V-groove pulley on the generator which will transmit torque from the V-belt or V-belts connected to the crankshaft pulley as well as provide vanes on this pulley forming a fan to circulate cooling air through the generator.

Certain prior constructions of generator pulleys have been formed principally of sheet metal and have included a V-groove member mounted telescoped over a hub member, with the V-groove member having a single V-shaped groove formed in an axially extending flange thereof, and with this axially extending flange terminating in a radially outwardly extending flange. Further, a generally radially extending plate has been mounted telescoped over the hub member having vanes formed therein and extending radially outwardly adjacent the V-groove member flange, where this plate has been secured to the V-groove member flange.

In this manner, the V-groove member, being relatively stiff due to its axially extending flange and the V-grooves formed therein, serves to support the vane plate, so that the vane plate, although being merely a radially extending plate, can be formed from relatively thin metal and still have the stiffness required. Through the period of years, however, as the steel industry improved the quality of steel and as the V-groove pulley industry progressed, it was found that it was possible to merely form the V-groove member with its usual radially extending flange, and thereafter merely form the vanes directly from this flange, thereby greatly simplifying generator pulley constructions.

This generator pulley construction formed from merely a hub and a single piece of sheet steel has proved satisfactory for single groove generator pulleys. However, with the advent in recent years of higher horsepower vehicle engines and more electrical devices on the vehicle, including an increased number of lights, it has been found necessary to equip the vehicles with larger and higher capacity generators.

It has further been found that it is impossible to drive these larger and higher capacity generators with a single V-belt from the crank-shaft, so that it is necessary to provide a generator pulley having multiple generally parallel V-grooves therein. In forming such a multi-groove generator pulley, if the V-groove member thereof is to be formed from a single piece, it has been found impossible, with the use of existing equipment and material, to terminate the axially extending flange of the V-groove member in which the V-grooves are formed with a radially extending flange in which vanes can be formed, or which can serve as a support for a separate vane plate.

Thus, even though a separate vane plate is used, there is the problem of providing support for the vane plate so that the vane plate is of the necessary stiffness to operate satisfactorily. A separate vane plate, independent of any support of the V-groove member, could be provided by using a much greater thickness of metal to form this plate and mounting such plate separately on the pulley hub; however, this would add greatly to the cost of the final assembled pulley.

It is therefore a general object of the present invention to provide a multi-groove generator pulley construction which solves the foregoing problems.

It is a primary object of the present invention to provide a multi-groove generator pulley construction in which the V-groove member is formed of one piece with the vane plate being formed of a separate piece, and in which the vane plate may be formed of the same thickness of metal as was formerly used on prior generator pulleys.

It is a further object of the present invention to provide a multi-groove generator pulley construction in which the V-groove member is formed from one piece and the vane plate is formed from a separate piece, and in which the vane plate is properly supported by the V-groove member in the assembled pulley.

Finally, it is an object of the present invention to provide a multi-groove generator pulley construction which satisfies the above objects, is simple in construction and may be manufactured at a minimum of cost.

These and other objects are accomplished by the parts, constructions, arrangements, combinations and subcombinations comprising the present invention, the nature of which is set forth in the following general statement, a preferred embodiment of which—illustrative of the best mode in which applicant has contemplated applying the principles—is set forth in the following description and illustrated in the accompanying drawings, and which is particularly and distinctly pointed out and set forth in the appended claims forming a part hereof.

In general terms the multi-groove generator pulley construction comprising the present invention may be stated as including a hub member having a V-groove member and a vane plate mounted thereon and preferably telescoped thereover. The hub member is preferably formed from bar steel and is hollow cylindrical in configuration.

The V-groove member is preferably formed from relatively thin sheet steel and extends generally radially outwardly of the hub member in a generally radially extending flange portion, which portion terminates outwardly in a generally axially extending flange. The axially extending flange is provided with a series of parallel generally V-shaped grooves formed therein and extending around the circumference thereof.

The vane plate is also preferably formed of relatively thin sheet steel and also extends generally radially outwardly of the hub member in a generally radially extending flange portion, at least a part of which abuts the V-groove member radially extending flange.

Further, vanes are formed in the vane plate radially outwardly of the V-groove member axially extending flange. Finally, means is provided for securing at least a part of the abutting portions of the V-groove member and vane plate together and for securing the V-groove member and vane plate to the hub member, such means preferably being brazed portions.

By way of example, an embodiment of the improved multi-groove generator pulley construction of the present invention is illustrated in the accompanying drawings forming a part hereof, wherein like numerals indicate similar parts throughout the several views, and in which:

Fig. 1 is an end view looking at the vane plate thereof; and

Figure 2:
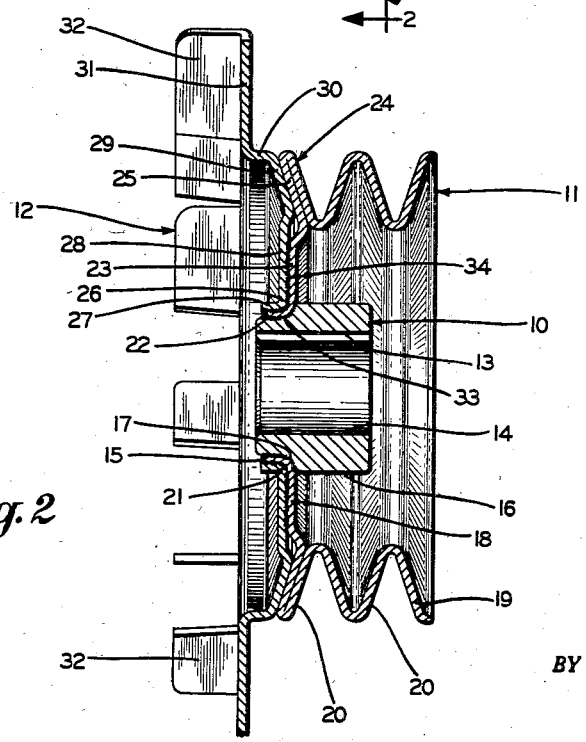

Fig. 2, a sectional view, part in elevation, looking in the direction of the arrows 2—2 in Fig. 1.

The multi-groove generator pulley construction comprising the present invention includes a hub member, generally indicated at 10, a V-groove member, generally indicated at 11, and a vane plate, generally indicated at 12. The hub member 10 is preferably formed from bar steel and the V-groove member and vane plate are preferaly formed from relatively thin hot rolled sheet steel in the order of .065" thickness.

Hub member 10 is generally hollow cylindrical in configuration and is preferably provided with a usual keyway 13 formed in the inner surface 14 thereof. Further, hub 10 is preferably provided with a reduced diameter portion 15 on the outer surface thereof blended into the outer circumferential surface 16 by the radiused portion 17.

The V-groove member 11 is cup-like in configuration and includes the generally radially extending flange portion 18 and the generally axially extending flange portion 19. Axially extending flange portion 19 has a series of generally parallel V-shaped grooves 20 formed therein, and such grooves may be formed according to the methods and by the apparatus described and claimed in the co-pending Killian et al, patent applications Serial No. 488,870 and Serial No. 497,880.

Further, the radially extending flange portion 18 terminates inwardly in a radiused portion 21 and then in a relatively short axially extending portion 22. V-groove member 11 is positioned telescoped over the hub reduced diameter portion 15 with the V-groove member radiused portion 21 abutting the hub radiused portion 17.

Outwardly of radiused portion 21, V-groove member 11 is formed with a preferably flat generally radially extending portion 23. Further, the innermost of the V-shaped grooves 20 is preferably formed in axially extending flange portion 19 directly adjoining radially extending flange portion 18, thereby forming a double flange portion 24 and resulting in an angled portion 25 on radially extending flange portion 18 outwardly of flat portion 23.

Vane plate 12, similar to V-groove member 11, terminates inwardly in a radius portion 26 and a relatively short axially extending portion 27. Further, vane plate 12 is preferably telescoped over the axially extending portion 22 of V-groove member 11, so that the radius portions 21 and 26 and the axially extending portions 22 and 27 of V-groove member 11 and vane plate 12, respectively, are in abutting relation.

Again, similar to V-groove member 11, vane plate 12 is formed outwardly of radius portion 26 in a preferably flat generally radially extending portion 28 which abuts the radially extending portion 23 of V-groove member 11. Also outwardly of its radially extending portion 28, vane plate 12 is formed with an angled portion 29 abutting the angled portion 25 of V-groove member 11.

Angled portion 29 of vane plate 12 preferably terminates radially-outwardly at the same radial point at which the angled portion 25 of V-groove member 11 terminates, and thereafter vane plate 12 is preferably formed in a relatively short axially extending portion 30 which extends away from V-groove member 11. Vane plate 12 is then formed to again extend generally radially-outwardly in a flat portion 31, and a series of circumferentially spaced generally axially extending vanes 32 are formed in flat portion 31, as shown.

V-groove member 11 and vane plate 12 may be secured to hub member 10 by any usual fastening means. It is preferred, however, that copper brazing is used for purposes of economy, strength and simplicity of assembly. Thus, as shown in Fig. 2, it is preferred that V-groove member 11 is secured to hub member 10 by brazing, as shown at 33, and that vane plate 12 is secured to V-groove member 11 by brazing, as shown at 34.

An important feature of the present invention is that V-groove member 11 and vane plate 12 are both formed with substantially flat radially extending portions 23 and 28, respectively, which radially extending portions are positioned in abutting relation so that these portions may be secured together. In this manner V-groove member 11 provides support for vane plate 12, and also vane plate 12 provides support for V-groove member 11, so that both this member and plate may be formed from their usual relatively thin sheet steel and will have the required strength and stiffness in use.

It should be understood, however, that the particular configuration of V-groove member 11 and vane plate 12, and the particular positioning of this member and plate on hub member 10 are not of importance other than that radially extending portions of each of member 11 and plate 12 must be positioned in abutting relation, so that these portions may be secured together to provide the additional support for member 11 and plate 12. Also, in the particular embodiment shown, it may be desired to provide fastening means, such as brazing, between angled portions 25 and 29 of V-groove member 11 and vane plate 12, thereby providing still additional support for this member and plate.

Thus, according to the principles of the present invention, a multi-groove generator pulley construction is provided which solves the before-discussed problems of prior constructions; in which the V-groove member is formed of one piece with the vane plate being formed of a separate piece, and in which the vane plate may be formed of the same thickness of metal as was formerly used on prior generator pulleys; in which the V-groove member is formed from one piece and the vane plate is formed from a separate piece, and in which the vane plate is properly supported by the V-groove member in the assembled pulley; and which provides all of the above advantageous features yet is simple in construction and may be manufactured at a minimum of cost.

In the foregoing description, certain terms have been used for brevity, clearness, and understanding, but no unnecessary limitations are to be implied therefrom, because such words are used for descriptive purposes herein, and are intended to be broadly construed.

Moreover, the embodiment of the improved construction illustrated and described herein is by way of example, and the scope of the present invention is not limited to the exact details of the construction shown.

Having now described the invention, the construction, operation and use of a preferred embodiment thereof, and the advantageous, new and useful results obtained thereby; the new and useful construction and reasonable mechanical equivalents thereof obvious to those skilled in the art are set forth in the appended claims.

I claim:

1. A pulley construction including a hub member, a generally cup-shaped V-groove member having a generally radially extending flange terminating outwardly in a generally axially extending flange, said V-groove member axially extending flange terminating in an open end spaced from said radially extending flange, said V-groove member axially extending flange having at least two generally parallel V-shaped grooves formed therein, a vane plate having a series of circumferentially spaced generally axially extending vanes formed therein and a generally radially extending part, the hub member having a reduced diameter portion on an outer circumferential surface thereof forming an axially extending portion terminating in an arcuately curved portion, each of the V-groove member and vane plate terminating inwardly in an arcuately curved portion terminating in an axially extending portion, the V-groove member radially extending flange having at least a part thereof formed substantially flat, the vane plate having at least a part of the generally radially extending part formed substantially flat, the vane plate and V-groove member being positioned telescoped over the hub member with said vane plate and V-groove member and hub member axially extending portions and arcuately curved portions in telescoped abutting relation, said vane plate and V-groove member flat parts also being positioned in abutting relation, means for securing said hub member and vane plate and V-groove member axially extending portions and arcuately curved portions together, means for securing said vane plate and V-groove member flat parts together, said V-groove member axially extending flange extending axially away from said vane plate with said axially extending flange open end being spaced from said vane plate, and the abutment of said vane plate and V-groove member flat parts providing support between said vane plate and V-groove member.

2. A pulley construction including a hub member, a generally cup-shaped V-groove member having a generally radially extending flange terminating outwardly in a generally axially extending flange, said V-groove member axially extending flange terminating in an open end spaced from said radially extending flange, said V-groove member axially extending flange having at least two generally parallel V-shaped grooves formed therein, a vane plate having a series of circumferentially spaced generally axially extending vanes formed thereon and a generally radially extending part, the V-groove member radially extending flange having at least a part thereof formed substantially flat and a part thereof radially outward of said flat part formed at an angle to said flat part, the vane plate having at least a part of the generally radially extending part formed substantially flat and a part thereof radially outwardly of said flat part formed at an angle to said flat part, the vane plate and V-groove member being positioned telescoped over the hub member with said vane plate and V-groove member flat parts and angled parts positioned in abutting relation, means for securing said vane plate and V-groove member flat parts together, means for securing said vane plate and V-groove member on said hub member, said V-groove member axially extending flange extending axially away from said vane plate with said axially extending flange open end being spaced from said vane plate, and the abutment of said vane plate and V-groove member flat and angled parts providing support between said vane plate and V-groove member.

3. A pulley construction including a hub member, a generally cup-shaped V-groove member having a generally radially extending flange terminating outwardly in a generally axially extending flange, said V-groove member axially extending flange terminating in an open end spaced from said radially extending flange, said V-groove member axially extending flange having at least two generally parallel V-shaped grooves formed therein, a vane plate having a series of circumferentially spaced generally axially extending vanes formed thereon and a generally radially extending part, the hub member having a reduced diameter portion on an outer circumferential surface thereof forming an axially extending portion terminating in an arcuately curved portion, each of the V-groove member and vane plate terminating inwardly in an arcuately curved portion terminating in an axially extending portion, the V-groove member radially extending flange having at least a part thereof formed substantially flat and part thereof radially outwardly of said flat part formed at an angle to said flat part, the vane plate having at least a part of the generally radially extending part formed subtantially flat and a part thereof radially outwardly of said flat part formed at an angle to said flat part, the vane plate and V-groove member being positioned telescoped over the hub member with said vane plate and V-groove member and hub member axially extending portions and arcuately curved portions in telescoped abutting relation, said vane plate and V-groove member flat parts and angled parts also being positioned in abutting relation, means for securing said hub member and vane plate and V-groove member axially extending portions and arcuately curved portions together, means for securing said vane plate and V-groove member flat parts together, said V-groove member axially extending flange extending axially away from said vane plate with said axially extending flange open end being spaced from said vane plate, and the abutment of said vane plate and V-groove member flat and angled parts providing support between said vane plate and V-groove member.

References Cited in the file of this patent

UNITED STATES PATENTS

| | | |
|---|---|---|
| 2,620,675 | Meadows et al. | Dec. 9, 1952 |
| 2,646,689 | Mahr | July 28, 1953 |

FOREIGN PATENTS

| | | |
|---|---|---|
| 6,161 | Great Britain | of 1892 |
| 1,074,499 | France | Mar. 13, 1954 |